No. 764,733.

Patented July 12, 1904.

UNITED STATES PATENT OFFICE.

RICHARD LAUCH, OF UERDINGEN, GERMANY.

BLACK SULFUR DYE AND PROCESS OF MAKING SAME.

SPECIFICATION forming part of Letters Patent No. 764,733, dated July 12, 1904.

Application filed July 20, 1901. Serial No. 69,036. (Specimens.)

*To all whom it may concern:*

Be it known that I, RICHARD LAUCH, chemist and doctor of philosophy, a subject of the Emperor of Germany, residing at Uerdingen-on-the-Rhine, Germany, have invented certain new and useful Improvements in the Manufacture of a Black Direct-Dyeing Cotton-Dyestuff by Melting Paraämidodinitrodiphenylamin with Sulfur and Sodium Sulfids, and for which I demanded Letters Patent in Germany the 24th of December, 1900, in England the 8th of January, 1901, and in France the 10th of May, 1901, No. 299,264; and I do hereby declare that the following is a full, clear, and exact description thereof, which will enable others skilled in the art to which it appertains to make and use same.

This invention relates to the production of a black-dyeing cotton-dyestuff.

According to German Patent No. 105,632 paraämidodinitrodiphenylamin, obtained by the condensation of para-phenylendiamin with 1.3.4. dinitrochlorbenzene, gives by melting with sulfur and alkaline sulfids a black sulfur dye corresponding to the dyestuff, deriving from trinitro diphenylamin, which substance is obtained by the condensation of anilin with 1.3.4. dinitrochlorbenzene and further nitration. For the production of this black dyestuff temperatures of 220° to 240° are demanded. I have found that this statement is not right, because paraämidodinitrodiphenylamin under the conditions of the said specification yields an olive dyestuff, while trinitrodiphenylamin gives a gray black one and that amidodinitrodiphenylamin, if heated at temperatures not far over 180°, a shorter or longer time, yields dark blue to black dyestuffs, under which conditions trinitrodiphenylamin gives always the same gray black dye. The black dye which I claim herein from amidodinitrodiphenylamin differs from the black obtained from the trinitrodiphenylamin, as is easily understood from the following description: It dyes unmordanted cotton in cold or hot bath containing sodium sulfid and salt in deep black shades already sufficiently fast, becoming bluer by further treatment with bichromate and sulfate of copper, while the black of the said specification dyes gray black, becoming a little darker by further treatment, but never bluer. The first has a great technical value, but not the latter one. If both dyestuffs are isolated from their solutions by acids, my new black forms a dark black powder, soluble in cold concentrated sulfuric acid with a blue color, giving on addition of water a blue coloration and blue precipitate, while the other black is nearly insoluble in cold concentrated sulfuric acid and gives no coloration on addition of water and a green black precipitate.

For the production of my new black dyestuff from amidodinitrodiphenylamin it is most important to observe that the temperature be not too high, whereas the German patent demands 220° to 240° centigrade to produce an olive dye. Further, it is best to melt in the presence of a diluting agent like water and glycerin.

Without diluting agents, as is the case in the German patent, the melt becomes easily hard, and the transformation from blue to black and olive worked under the conditions of the said specification is nearly impossible to observe, and thus it is that the said specification claims only the worthless trinitrodiphenylamin for the production of a black sulfur dye. Further, the addition of water to the melt makes the dyestuffs clearer and deeper, and, together with glycerin, the reactions can be better directed.

The following direction will explain more exactly in what manner I proceed in order to carry out my invention.

Example I. Thirty-six parts, by weight, of paraämidodinitrodiphenylamin are introduced in a solution of one hundred and eighty parts of sodium sulfid cryst., sixty parts of sulfur, sixty parts of water, fifteen parts of glycerin at 90° to 100° and slowly heated in an oil-bath until the temperature of the oil-bath reaches about 180° in four hours. The fused mass remains fluid after the evaporation of the water and separates after two hours, the first reduced product obtained being in thick masses, which by further heating dissolve. At about 150° there is a violent reaction, the temperature rises at 165° centigrade under development of ammonia, and the fusion thickens. The temperature of the melt, if the reaction is finished, falls below 150°. The temperature of the bath is now raised to 180° and the melt still heated till its temperature reaches about 175° to 180°. Then further heating is unnecessary, and the dyestuff is formed. The melt is solid, but not absolutely dry. It becomes hard after cooling and can be pulverized, in which form the dyestuff is employed. It represents a powder, being a little hygroscopical, sufficiently soluble in water containing sodium sulfid with green color, which solution, if poured on paper, is oxidized to blue-black. From its solution acids separate the dyestuff as a precipitate, which if dried forms a deep black powder easily soluble in sodium sulfid with green color, which solution is oxidized, if poured on paper, to blue-black, soluble in cold concentrated sulfuric acid with blue color, and gives on addition of water a blue coloration and a blue precipitate insoluble in alcohol. It gives on boiling sometimes a weak blue coloration, and dyeing unmordanted cotton in a hot or cold bath containing sodium sulfid in deep black shades without wanting an oxidation and being already sufficiently fast, and becoming by further treatment with metallic salts, like bichromate, bluer and, with a mixture of sulfate of bichromate and copper, deeper, distinguished now by the fastness to acids, alkalies, and light.

The following alterations may be made in the above example without materially changing the character of the product obtained. The fifteen parts, by weight, of glycerin can be replaced, for example, by thirty-six parts. It is then possible to obtain the dyestuff at a lower temperature if the mixture is heated in an oil-bath ten to fifteen hours only at 135° centigrade. The high temperature is here compensated by the longer time of the reaction, ten to fifteen hours, which is made possible by the greater quantity of the glycerin employed. Otherwise the glycerin can be replaced by water in the following manner: The paraämidodinitrodiphenylamin is introduced in the same solution of sulfur and sodium sulfid as is described in the Example I, with the exception of glycerin. If the fusion begins to thicken at 145° to 150°, then about fifteen parts of water is added. The thus-diluted fusion can be stirred for a longer time and thickens again after half an hour. The evaporated water is thus replaced three to four times. After this the addition of water is stopped and the fusion finished, as is above described, and it is heated till 180° to 200° are reached. The addition of water, like the addition of glycerin, prevents a too-quick reaction, which would produce an olive or black green and not the blue-black or black intended.

As the above-given example may be varied in wide limits, as a matter of course I do not confine myself to the figures given in the above examples, as they are merely typical.

Having now described my invention and in what manner the same can be performed, what I claim as new is—

1. The black dye, which results from heating the herein-described solution of paraämidodinitrodiphenylamin in the herein-described solvents to a temperature below 180°, said dye being black in color, a little hygroscopical, readily soluble in cold water containing sodium sulfid with greenish color, becoming blue on addition of sodium sulfid which solution, if poured on paper, is oxidized to blue-black and yielding on addition of mineral or acetic acid a precipitate, which dried, forms a deep-black powder, easily soluble in sodium sulfid with bluish-green color, becoming less colored on heating by reduction which solution is oxidized if poured on paper, soluble in cold concentrated sulfuric acid with blue to green-blue color giving a blue coloration and a blue precipitate, on addition of water, insoluble in alcohol and giving sometimes a weak coloration on boiling, said dye producing on unmordanted cotton in a hot or cold bath containing alkaline-sulfid deep-black shades without further oxidation, remarkably fast and becoming better by further treatment with metallic salts, like bichromate and sulfate of copper, characterized by the fastness to acid, alkali and light, substantially as set forth.

2. The process herein described of producing a black direct-dyeing cotton-dyestuff, which consists in heating the herein-described solution of paraämidodinitrodiphenylamin with sulfur and alkaline sulfids to a temperature of about 180°, substantially as described.

In witness whereof I have hereunto set my hand in presence of two witnesses.

RICHARD LAUCH.

Witnesses:
  Wm. P. Phelps,
  M. E. Kennedy.